US010061409B2

(12) United States Patent
Usami

(10) Patent No.: US 10,061,409 B2
(45) Date of Patent: Aug. 28, 2018

(54) HEAD-MOUNTED DISPLAY, DISPLAY CONTROL METHOD, AND POSITION CONTROL METHOD

(71) Applicant: Sony Computer Entertainment Inc., Tokyo (JP)

(72) Inventor: Morio Usami, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 53 days.

(21) Appl. No.: 15/052,373

(22) Filed: Feb. 24, 2016

(65) Prior Publication Data

US 2016/0282963 A1 Sep. 29, 2016

(30) Foreign Application Priority Data

Mar. 25, 2015 (JP) ................... 2015-062464

(51) Int. Cl.
*G06F 3/0362* (2013.01)
*G02B 27/01* (2006.01)

(52) U.S. Cl.
CPC ......... *G06F 3/0362* (2013.01); *G02B 27/017* (2013.01); *G02B 2027/0156* (2013.01); *G02B 2027/0165* (2013.01); *G02B 2027/0198* (2013.01)

(58) Field of Classification Search
CPC .............. G06T 19/006; G02B 27/0172; G02B 27/017; G02B 2027/0178; G02B 2027/0179
USPC ............................................. 345/8; 359/238
See application file for complete search history.

(56) References Cited

U.S. PATENT DOCUMENTS

| 5,572,343 | A | * | 11/1996 | Okamura | ............. | G02B 27/017 345/8 |
| 5,801,885 | A | * | 9/1998 | Togino | ............... | G02B 27/0172 359/630 |
| 6,396,639 | B1 | * | 5/2002 | Togino | ............... | G02B 17/0816 359/630 |
| 8,941,560 | B2 | * | 1/2015 | Wong | ................... | G02B 27/017 345/7 |
| 2002/0167536 | A1 | * | 11/2002 | Valdes | ................... | G02B 27/01 345/633 |
| 2008/0048930 | A1 | * | 2/2008 | Breed | ..................... | B60N 2/002 345/7 |
| 2011/0051273 | A1 | * | 3/2011 | Tronvig | ............... | A42B 3/0426 359/876 |
| 2013/0249776 | A1 | * | 9/2013 | Olsson | .................... | G06F 1/163 345/8 |
| 2013/0335303 | A1 | * | 12/2013 | Maciocci | ............. | G02B 27/017 345/8 |
| 2014/0177023 | A1 | * | 6/2014 | Gao | ..................... | H04N 5/2258 359/238 |

(Continued)

*Primary Examiner* — Kent Chang
*Assistant Examiner* — Sujit Shah
(74) *Attorney, Agent, or Firm* — Katten Muchin Rosenman LLP

(57) ABSTRACT

The present technology enables a user wearing a head-mounted display having a display section provided in front of the eyes of the user to directly check a state in front of the user. A head-mounted display includes: a display section; a casing supporting the display section in front of eyes of a user; and an optical system supported by the casing, the optical system allowing the user to view an image of an object disposed in a rear of the display section as viewed from the user.

9 Claims, 9 Drawing Sheets

(56) References Cited

U.S. PATENT DOCUMENTS

2014/0266987 A1\* 9/2014 Magyari ............ G02B 27/0172
345/8

\* cited by examiner

F I G . 1
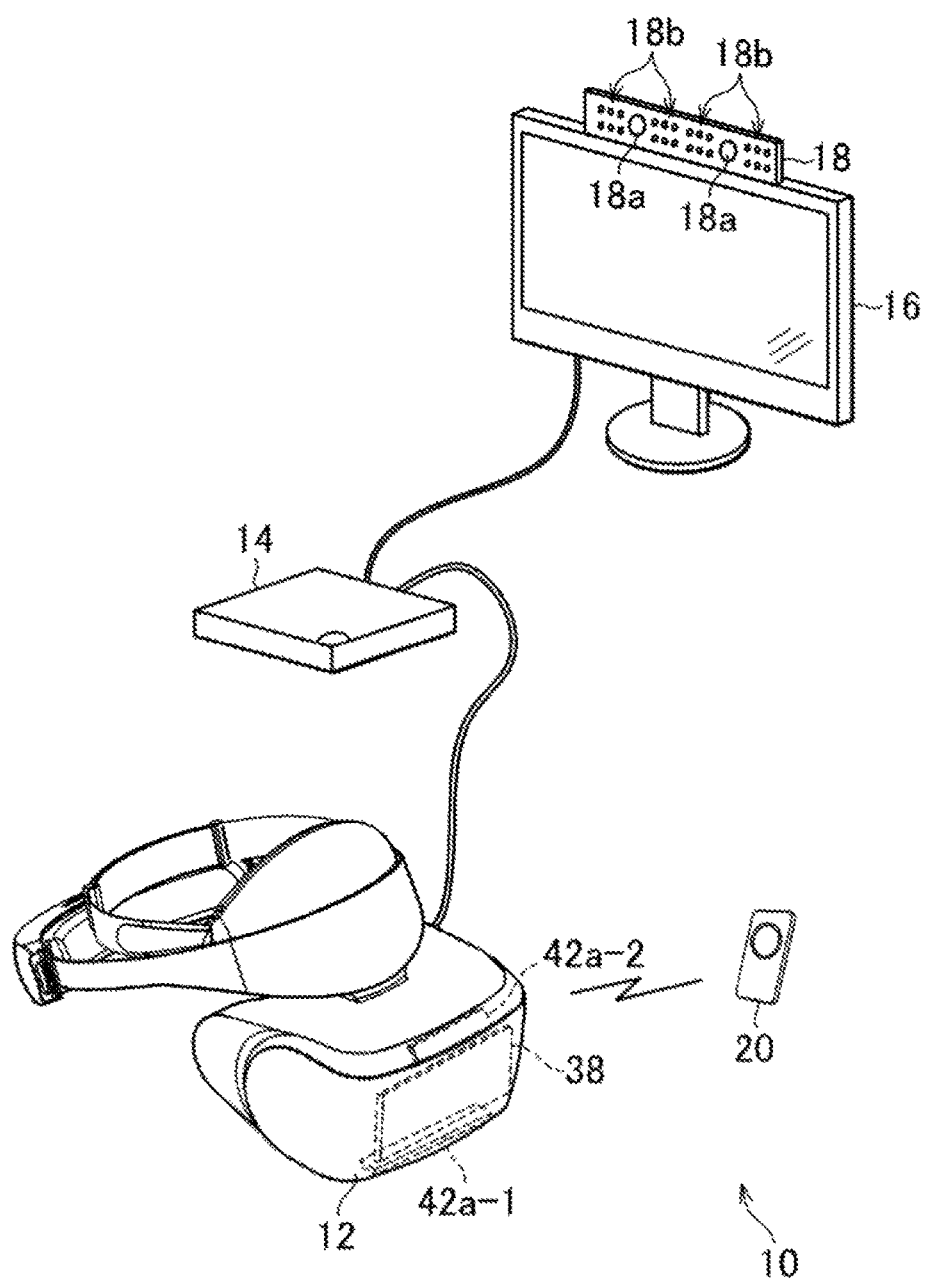

HEAD-MOUNTED DISPLAY, DISPLAY CONTROL METHOD, AND POSITION CONTROL METHOD

BACKGROUND

The present technology relates to a head-mounted display, a display control method, and a position control method.

A head-mounted display (HMD) is known which a user wears on the head of the user to enjoy video, for example.

Among such HMDs, there is an HMD that allows a user to check a state of the outside without removing the HMD. For example, there is an HMD that allows a user to check a state of the outside through a hole provided to a casing, or there is an HMD that allows a user to check a state of the outside by displaying video obtained by photographing the outside of the HMD with a mounted camera.

SUMMARY

However, when the HMD that allows the state of the outside to be checked through the hole provided to the casing has a display section provided in front of the eyes of the user, the display section becomes an obstacle that prevents the user wearing the HMD from directly checking the state in front of the user. The HMD that displays the video obtained by photographing the outside with the mounted camera also prevents the user from directly checking the state in front of the user.

The present technology has been made in view of the above-described actual situations. It is desirable to enable a user wearing a head-mounted display having a display section provided in front of the eyes of the user to directly check a state in front of the user.

According to one mode of the present technology, there is provided a head-mounted display including: a display section; a casing supporting the display section in front of eyes of a user; and an optical system supported by the casing, the optical system allowing the user to view an image of an object disposed in a rear of the display section as viewed from the user.

In the mode of the present technology, a hole is formed in the casing, and the optical system includes a mirror that can open and close the hole.

In this mode, the head-mounted display may further include a video output control section controlling output of video by the display section, and the video output control section may limit the output of the video by the display section when the hole is opened.

In addition, the head-mounted display may further include a position control section controlling a position of the mirror such that the position of the mirror becomes a position of closing the hole or a position of opening the hole, according to whether or not a predetermined condition holds.

Here, the predetermined condition may be a condition related to a position or attitude of the head-mounted display, a condition related to brightness of video displayed on the display section, or a condition related to magnitude of a detected sound.

In addition, according to another mode of the present technology, there is provided a display control method of a head-mounted display, the head-mounted display including a display section, a casing supporting the display section in front of eyes of a user, the casing having a hole formed in the casing, and an optical system including a mirror that can open and close the hole, the optical system being supported by the casing, and the optical system allowing the user to view an image of an object disposed in a rear of the display section as viewed from the user, the display control method including: limiting output of video by the display section when the hole is opened.

In addition, according to a further mode of the present technology, there is provided a position control method of a head-mounted display, the head-mounted display including a display section, a casing supporting the display section in front of eyes of a user, the casing having a hole formed in the casing, and an optical system including a mirror that can open and close the hole, the optical system being supported by the casing, and the optical system allowing the user to view an image of an object disposed in a rear of the display section as viewed from the user, the position control method including: controlling a position of the mirror such that the position of the mirror becomes a position of closing the hole or a position of opening the hole, according to whether or not a predetermined condition holds.

BRIEF DESCRIPTION OF THE DRAWINGS

FIG. 1 is a diagram showing an example of a general constitution of a video display system according to one embodiment of the present technology;

DETAILED DESCRIPTION OF THE PREFERRED EMBODIMENTS

One embodiment of the present technology will hereinafter be described with reference to the drawings.

Figure 2:
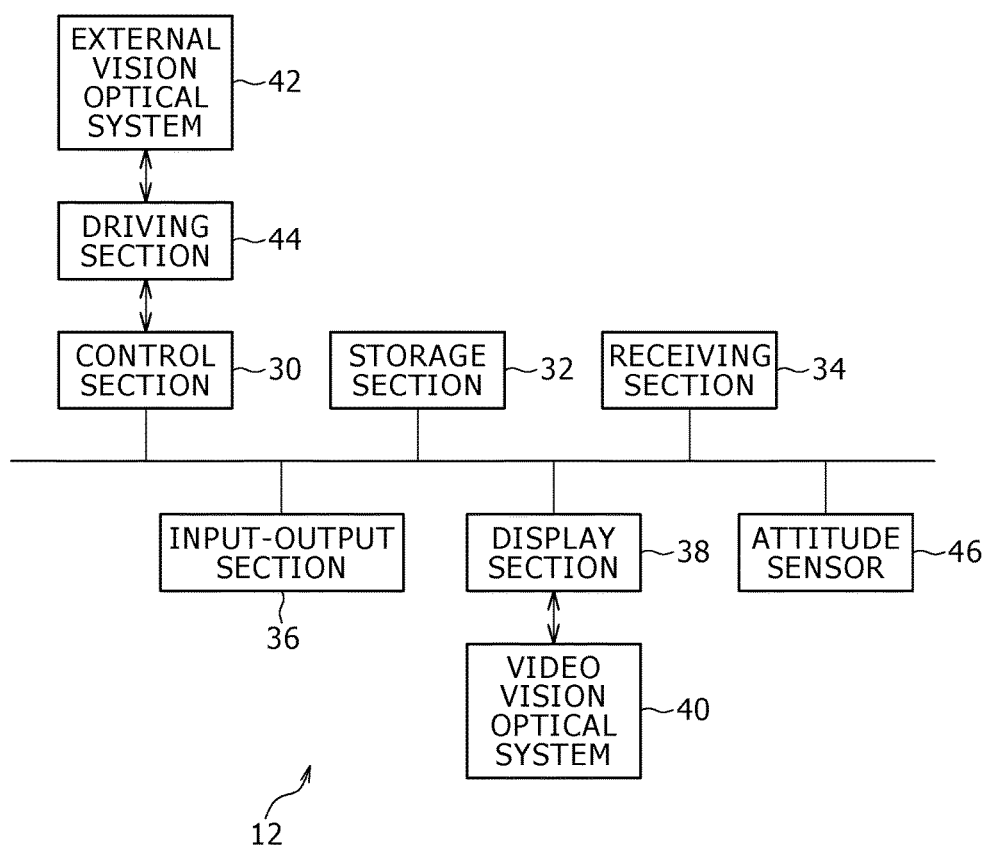
FIG. 2 is a diagram showing an example of a configuration of a head-mounted display according to the embodiment of the present technology.
Figure 3:
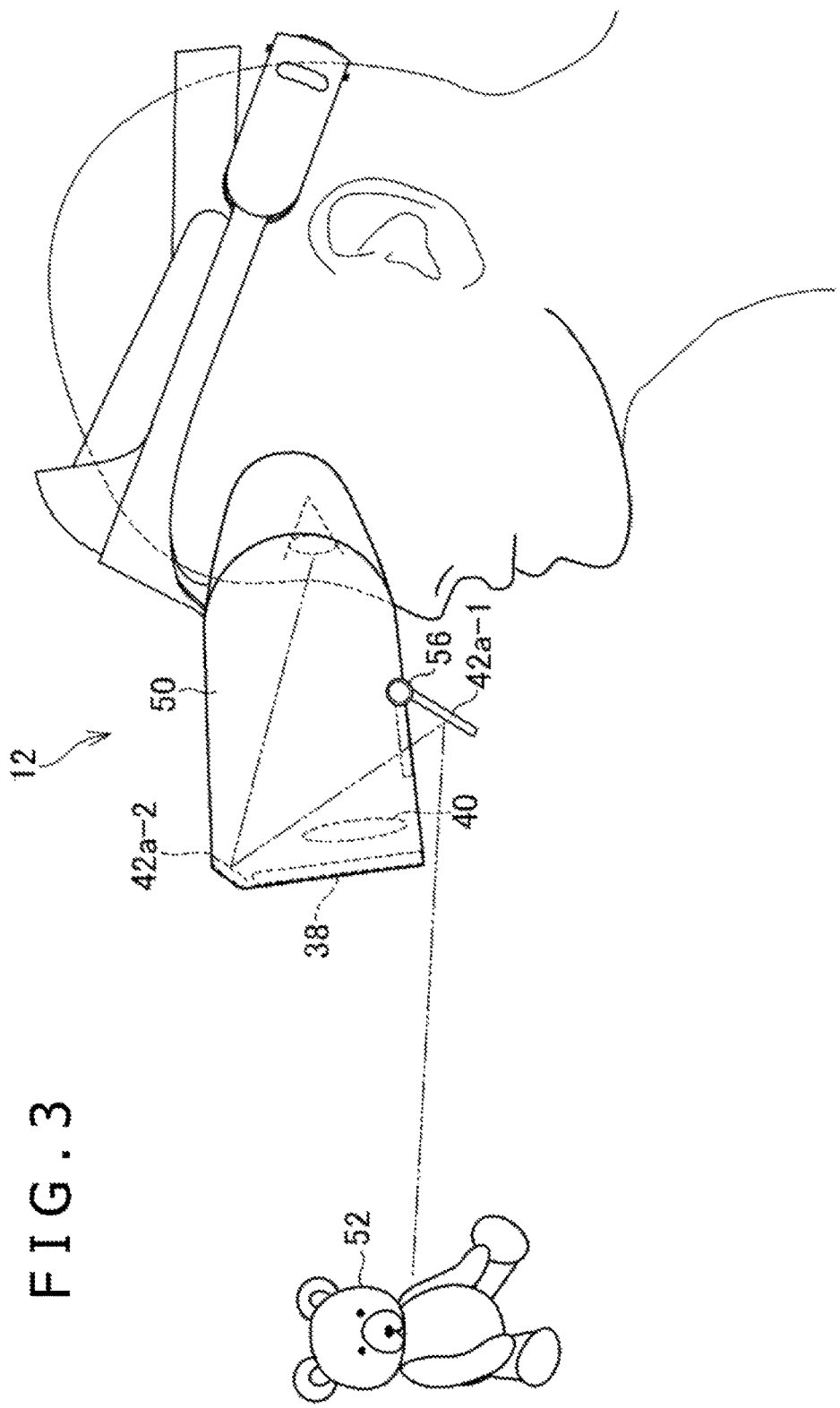
FIG. 3 is a diagram schematically showing an example of a state in which a user wearing a head-mounted display according to the embodiment of the present technology is viewed from left.

FIG. 1 is a diagram showing an example of a general constitution of a video display system 10 according to one embodiment of the present technology. FIG. 2 is a diagram showing an example of a configuration of a head-mounted display (HMD) 12 according to the present embodiment. FIG. 3 is a diagram schematically showing an example of a state in which a user wearing the HMD 12 according to the present embodiment is viewed from left.

As shown in FIG. 1, the video display system 10 according to the present embodiment includes the HMD 12, an entertainment device 14, a display 16, a camera and microphone unit 18, and a controller 20.

The entertainment device 14 and the display 16 are for example connected to each other via a high-definition multimedia interface (HDMI) (registered trademark) cable or the like. The entertainment device 14 and the camera and microphone unit 18 are for example connected to each other via an HDMI cable, a universal serial bus (USB) cable, or the like. In addition, the HMD 12 and the entertainment device 14 are for example connected to each other via an HDMI cable, a USB cable, or the like.

The entertainment device 14 according to the present embodiment is for example a computer such as a game console, a digital versatile disk (DVD) player, a Blu-ray (registered trademark) player, or the like. The entertainment device 14 according to the present embodiment for example outputs, to the HMD 12 and the display 16, a video signal representing video generated by the execution of an installed game program, the reproduction of an optical disk being read, or the like.

The display 16 according to the present embodiment is for example a liquid crystal display or the like. The display 16 displays the video represented by the video signal output from the entertainment device 14 or the like.

The camera and microphone unit 18 according to the present embodiment for example includes cameras 18a that output an image obtained by imaging a subject to the entertainment device 14 and microphones 18b that obtain ambient sound, convert the sound into audio data, and output the audio data to the entertainment device 14.

The controller 20 according to the present embodiment is for example a remote controller having a switch. The controller 20 for example transmits an operating signal such as an infrared signal or the like in response to the depression of the switch.

As shown in FIG. 2, the HMD 12 according to the present embodiment includes for example a control section 30, a storage section 32, a receiving section 34, an input-output section 36, a display section 38, a video vision optical system 40, an external vision optical system 42, a driving section 44, and an attitude sensor 46. As shown in FIG. 3, a casing 50 of the HMD 12 according to the present embodiment has a cavity formed within the casing 50, and supports the display section 38, the video vision optical system 40, and the external vision optical system 42.

The control section 30 is for example a program control device such as a central processing unit (CPU) or the like that operates according to a program stored in the storage section 32.

The storage section 32 is for example a storage element such as a read only memory (ROM), a random access memory (RAM), and the like. The storage section 32 stores the program executed by the control section 30 and the like.

The receiving section 34 receives the operating signal such as the infrared signal or the like transmitted from the controller 20.

The input-output section 36 is for example an input-output port such as an HDMI port, a USB port, or the like.

The display section 38 is for example a display such as a liquid crystal display, an organic electroluminescence (EL) display, or the like. The display section 38 displays the video represented by the video signal output from the entertainment device 14 and the like. In the present embodiment, as shown in FIG. 3, the casing 50 supports the display section 38 in front of the eyes of the user. Incidentally, the display section 38 according to the present embodiment may be capable of displaying three-dimensional video.

The video vision optical system 40 is an optical system such as a lens or the like that is disposed between the display section 38 and the eyes of the user viewing the video displayed on the display section 38.

Figure 4:
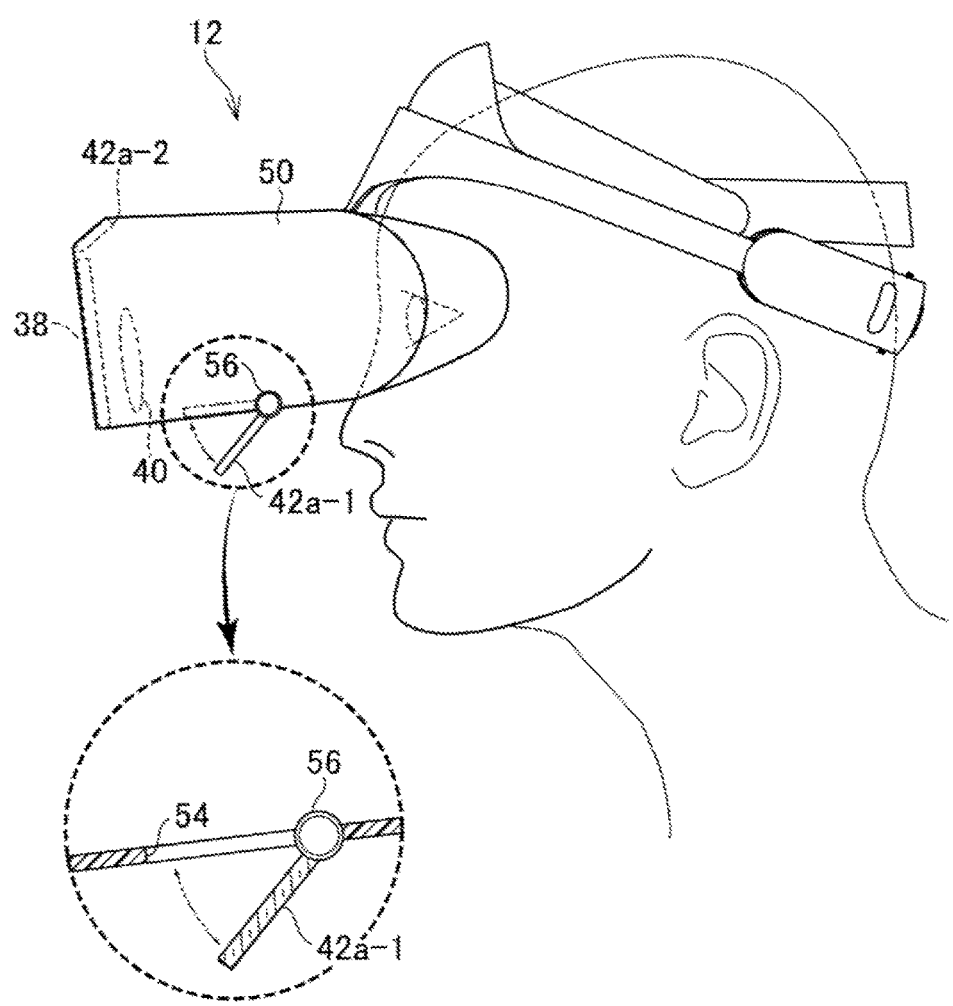
FIG. 4 is a diagram of assistance in explaining a first mirror provided to the head-mounted display shown in FIG. 3 which first mirror can open and close a hole.

The external vision optical system 42 is an optical system that allows the user to view a state of the outside of the casing 50. As shown in FIG. 3, the external vision optical system 42 according to the present embodiment allows the user to view an image of an object 52 disposed in the rear of the display section 38 as viewed from the user. As shown in FIG. 3, the external vision optical system 42 according to the present embodiment includes a first mirror 42a-1 disposed in a lower inside portion of the casing 50 and a second mirror 42a-2 disposed in an upper inside portion of the casing 50. In addition, as shown in FIG. 4, a hole 54 is formed in an undersurface of the casing 50 of the HMD 12 according to the present embodiment. An end portion of the first mirror 42a-1 according to the present embodiment is coupled to an opening and closing shaft 56 supported in the undersurface by the casing 50. The opening and closing shaft 56 rotates so that the first mirror 42a-1 can open and close the hole 54. In the present embodiment, arrangement of the first mirror 42a-1 and the second mirror 42a-2 at appropriate positions causes light reflected by the object 52 to be reflected by the first mirror 42a-1 and the second mirror 42a-2 and enter the eyes of the user, so that the user can view the object 52. That is, in the present embodiment, by seeing the second mirror 42a-2, the user can view the image of the object 52 disposed in the rear of the display section 38 as viewed from the user. Thus, in the present embodiment, the user wearing the HMD 12 in which the display section 38 is provided in front of the eyes of the user can directly check the state in front of the user.

The driving section 44 is a motor or the like. The driving section 44 for example rotates the opening and closing shaft 56 coupled to the first mirror 42a-1 in the undersurface of the casing 50 according to a position control signal received from the control section 30.

The attitude sensor 46 is for example a sensor such as an acceleration sensor, a gyro sensor, or the like. The attitude sensor 46 measures the attitude of the HMD 12.

Figure 5:
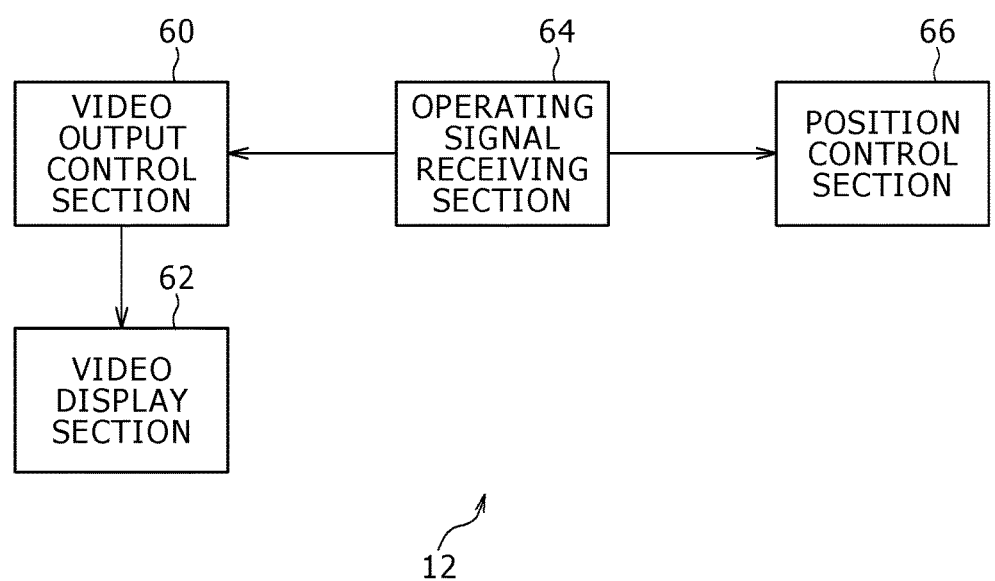
FIG. 5 is a functional block diagram showing an example of functions implemented by the head-mounted display according to the embodiment of the present technology.

FIG. 5 is a functional block diagram showing an example of functions implemented by the HMD 12 according to the present embodiment. It is to be noted that the HMD 12 according to the present embodiment does not need to implement all of the functions shown in FIG. 5, and may implement a function other than the functions shown in FIG. 5.

As shown in FIG. 5, the HMD 12 according to the present embodiment functionally includes for example a video output control section 60, a video display section 62, an operating signal receiving section 64, and a position control section 66. The video output control section 60 is implemented mainly in the control section 30 and the input-output section 36. The video display section 62 is implemented mainly in the display section 38. The operating signal receiving section 64 is implemented mainly in the receiving section 34. The position control section 66 is implemented mainly in the control section 30 and the driving section 44.

The above functions are implemented by the control section 30 by executing a program that is installed on the HMD 12 as a computer and which includes commands corresponding to the above functions. This program is for example supplied to the HMD 12 via a computer readable information storage medium such as an optical disk, a magnetic disk, a magnetic tape, a magneto-optical disk, a flash memory, or the like or via the Internet or the like.

The video output control section 60 in the present embodiment for example controls the output of the video by the video display section 62. The video output control section 60 for example receives the video signal output from the entertainment device 14 and displays the video represented by the video signal on the video display section 62.

The video display section 62 in the present embodiment for example displays the video according to the control by the video output control section 60. The video display section 62 for example displays the video represented by the video signal output from the entertainment device 14.

The operating signal receiving section 64 in the present embodiment for example receives the operating signal transmitted from the controller 20.

The position control section 66 in the present embodiment for example rotates the opening and closing shaft 56 according to the operating signal received by the operating signal receiving section 64.

In the present embodiment, when the operating signal receiving section 64 receives the operating signal in a case where the first mirror 42*a*-1 is disposed in a position of closing the hole 54, the position control section 66 for example moves the first mirror 42*a*-1 to a position of opening the hole 54. In addition, in this case, the position control section 66 in the present embodiment for example moves the first mirror 42*a*-1 to a position that allows the user to view an image of the object 52 as shown in FIG. 3.

In addition, in the present embodiment, when the operating signal receiving section 64 receives the operating signal in a case where the first mirror 42*a*-1 is disposed in the position of opening the hole 54, the position control section 66 for example moves the first mirror 42*a*-1 to the position of closing the hole 54.

The position control section 66 according to the present embodiment thus controls the position of the first mirror 42*a*-1 such that the position of the first mirror 42*a*-1 becomes the position of closing the hole 54 or the position of opening the hole 54. Therefore, in the present embodiment, by operating the controller 20, the user can switch between a condition in which the hole 54 is closed and the user can enjoy a sense of immersion in the video being displayed and a condition in which the hole 54 is opened and the user can check the state in front of the user.

Incidentally, when the hole 54 is opened, the video output control section 60 may limit the output of the video by the display section 38. For example, when the hole 54 is opened, the video output control section 60 may turn off the video being displayed or darken the video being displayed. This allows the user to view the state in front of the user more easily when the hole 54 is opened than in a case where the output of the video is not limited.

In addition, the position control section 66 may control the position of the first mirror 42*a*-1 such that the position of the first mirror 42*a*-1 becomes the position of closing the hole 54 or the position of opening the hole 54, according to whether or not a predetermined condition holds. The predetermined condition in this case includes for example a condition related to the position or attitude of the HMD 12, a condition related to the brightness of the video displayed on the display section 38, a condition related to the magnitude of a detected sound, and the like.

For example, when the position control section 66 determines that the HMD 12 has moved by a distance larger than a predetermined distance within a predetermined time or that the HMD 12 has rotated by an angle larger than a predetermined angle within a predetermined time, the position control section 66 may control the position of the first mirror 42*a*-1 such that the position of the first mirror 42*a*-1 becomes the position of opening the hole 54. In addition, for example, when the position control section 66 determines that a state in which an amount of movement of the HMD 12 is smaller than a predetermined value or a state in which an amount of rotation of the HMD 12 is smaller than a predetermined value has continued for a predetermined time or more, the position control section 66 may control the position of the first mirror 42*a*-1 such that the position of the first mirror 42*a*-1 becomes the position of closing the hole 54. In this case, the amount of movement or the amount of rotation of the HMD 12 can for example be identified on the basis of a detection result output by the attitude sensor 46. In addition, for example, when the cameras 18*a* photograph an image at predetermined time intervals, the HMD 12 may receive the photographed images. In this case, the amount of movement or the amount of rotation of the HMD 12 can be identified on the basis of the images.

In addition, for example, the position of the first mirror 42*a*-1 may be controlled to be the position of closing the hole 54 or the position of opening the hole 54 according to a positional relation between the HMD 12 and the entertainment device 14. Specifically, for example, when a distance between the HMD 12 and the entertainment device 14 becomes shorter than a predetermined length, the position control section 66 may control the position of the first mirror 42*a*-1 such that the position of the first mirror 42*a*-1 becomes the position of opening the hole 54. In addition, for example, when the distance between the HMD 12 and the entertainment device 14 becomes longer than a predetermined length, the position control section 66 may control the position of the first mirror 42*a*-1 such that the position of the first mirror 42*a*-1 becomes the position of closing the hole 54. In this case, the distance between the HMD 12 and the entertainment device 14 can for example be identified on the basis of the images of the HMD 12 which images are photographed by the cameras 18*a* at predetermined time intervals.

In addition, for example, the position control section 66 may control the position of the first mirror 42*a*-1 such that the position of the first mirror 42*a*-1 becomes the position of closing the hole 54 or the position of opening the hole 54, according to the brightness of the video displayed on the display section 38. Specifically, for example, the position control section 66 may receive the signal representing the video displayed on the display section 38 from the video output control section 60. Then, the position control section 66 may control the position of the first mirror 42*a*-1 such that the position of the first mirror 42*a*-1 becomes the position of closing the hole 54 or the position of opening the hole 54, according to the brightness of the video displayed on the display section 38 which brightness is identified on the basis of the signal received from the video output control section 60. For example, when a state in which the video displayed on the display section 38 is darker than a predetermined brightness has continued for a predetermined time or more, the position control section 66 may control the position of the first mirror 42*a*-1 such that the position of the first mirror 42*a*-1 becomes the position of opening the hole 54. In addition, for example, when video brighter than a predetermined brightness is displayed on the display section 38, the position of the first mirror 42*a*-1 may be controlled to be the position of closing the hole 54.

In addition, for example, the position of the first mirror 42*a*-1 may be controlled to be the position of closing the hole 54 or the position of opening the hole 54 according to the magnitude of a sound detected by the microphones 18b. For example, when a sound of a volume higher than a predetermined volume is detected, the position control section 66 may control the position of the first mirror 42a-1 such that the position of the first mirror 42a-1 becomes the position of opening the hole 54. In addition, for example, when a state in which a sound of a volume lower than a predetermined volume is detected has continued for a predetermined time or more, the position control section 66 may control the position of the first mirror 42a-1 such that the position of the first mirror 42a-1 becomes the position of closing the hole 54. Incidentally, when the HMD 12 has a microphone, the position of the first mirror 42a-1 may be controlled to be the position of closing the hole 54 or the position of opening the hole 54 according to the magnitude of a sound detected by the microphone of the HMD 12.

It is to be noted that the present technology is not limited to the foregoing embodiment.

Figure 6:
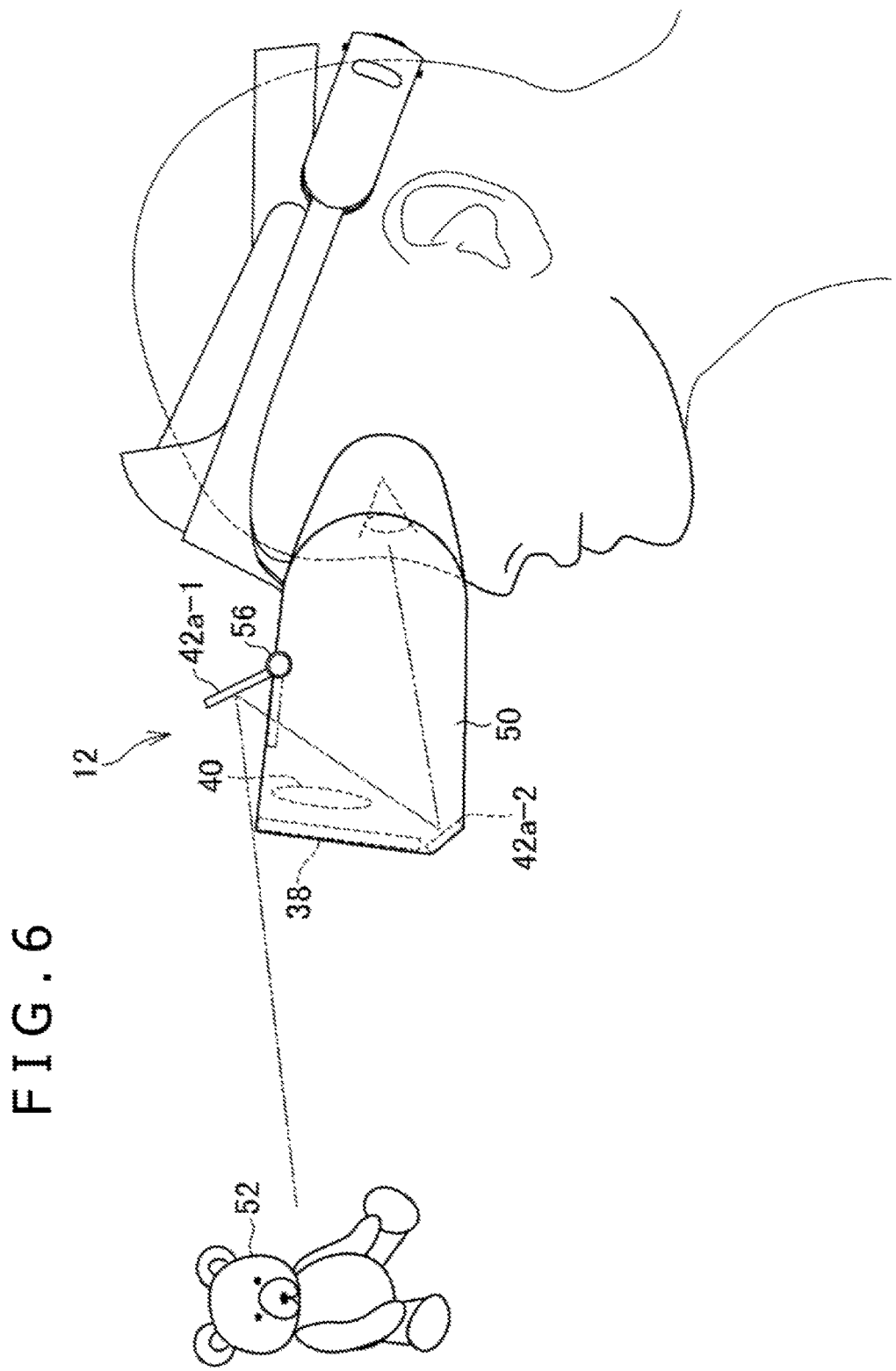
FIG. 6 is a diagram schematically showing an example of a state in which a user wearing a head-mounted display according to another embodiment of the present technology is viewed from left.

FIG. 6 is a diagram schematically showing an example of a state in which a user wearing an HMD 12 according to another embodiment of the present technology is viewed from left. As shown in FIG. 6, for example, an external vision optical system 42 may include a first mirror 42a-1 disposed in an upper inside portion of a casing 50 and a second mirror 42a-2 disposed in a lower inside portion of the casing 50. Then, a hole may be formed in a top surface of the casing 50 of the HMD 12. Then, an end portion of the first mirror 42a-1 may be coupled to an opening and closing shaft 56 supported in the top surface by the casing 50. The opening and closing shaft 56 may rotate so that the first mirror 42a-1 can open and close the hole.

Figure 7:
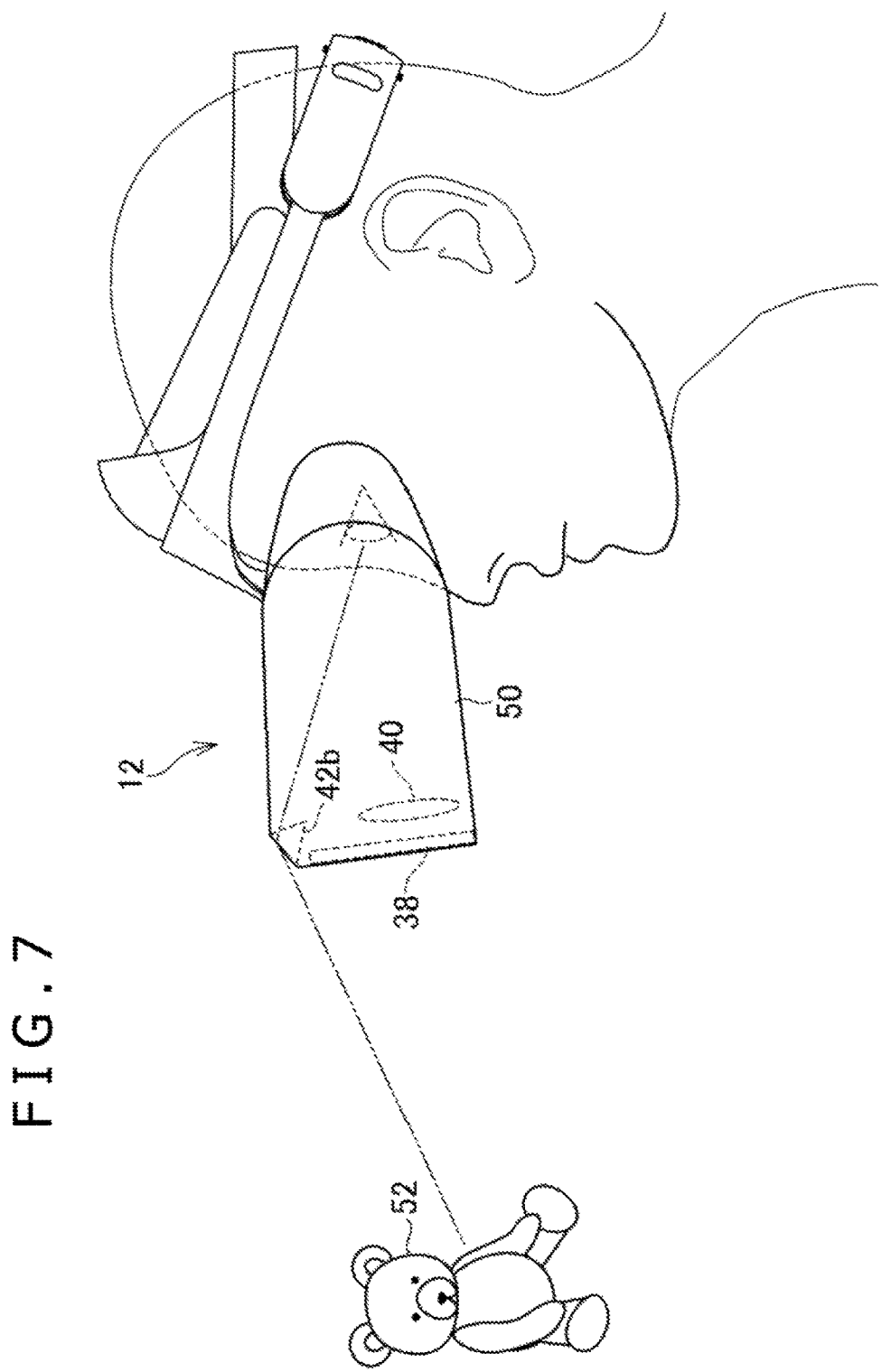
FIG. 7 is a diagram schematically showing an example of a state in which a user wearing a head-mounted display according to yet another embodiment of the present technology is viewed from left.

FIG. 7 is a diagram schematically showing an example of a state in which a user wearing an HMD 12 according to yet another embodiment of the present technology is viewed from left. As shown in FIG. 7, for example, an external vision optical system 42 may be a prism 42b. Thus, the external vision optical system 42 does not need to be the mirror 42a.

Figure 8:
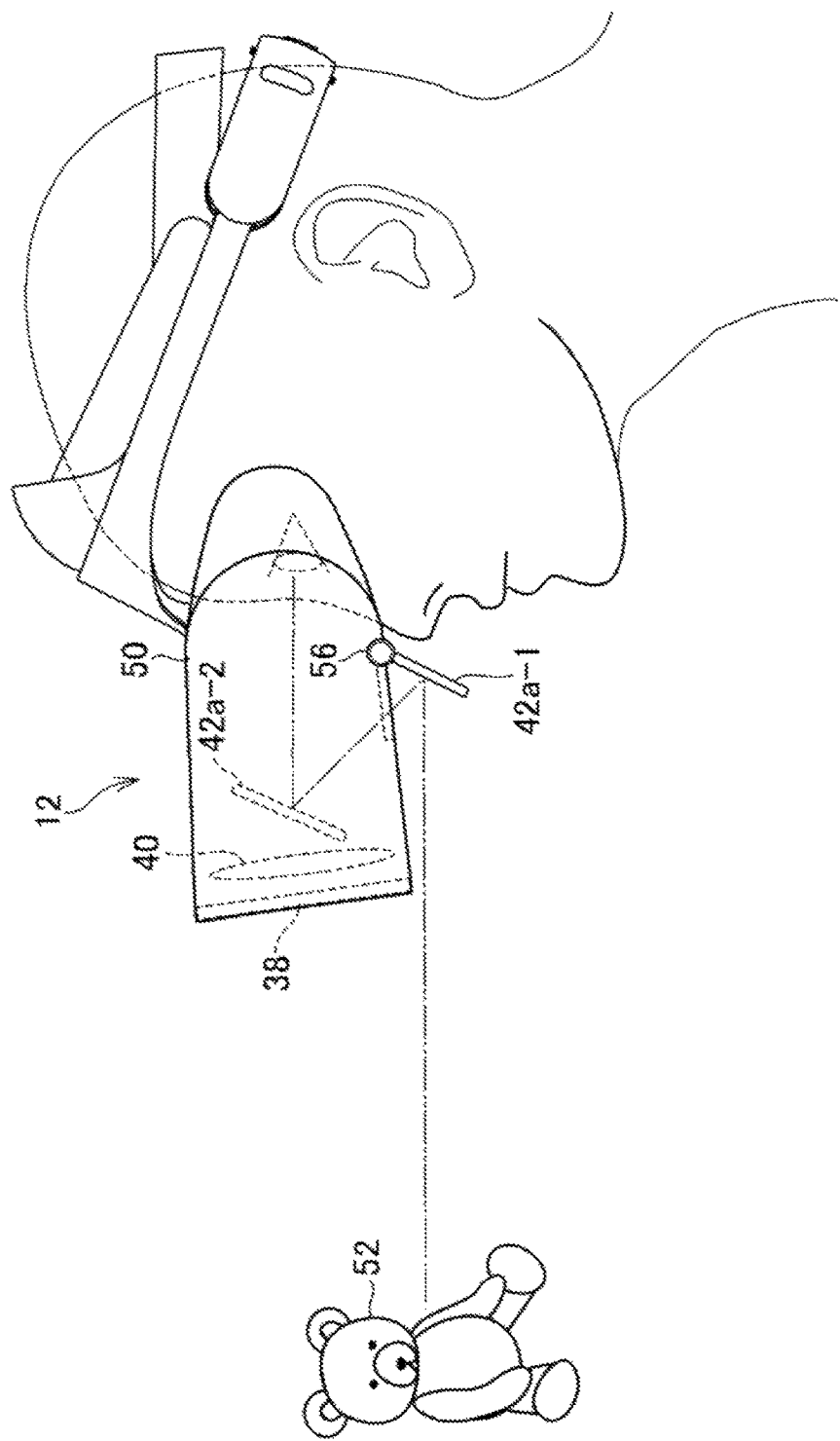
FIG. 8 is a diagram schematically showing an example of a state in which a user wearing a head-mounted display according to yet another embodiment of the present technology is viewed from left.

FIG. 8 is a diagram schematically showing an example of a state in which a user wearing an HMD 12 according to yet another embodiment of the present technology is viewed from left. As shown in FIG. 8, for example, a second mirror 42a-2 may be a mirror such as a half-silvered mirror or the like that reflects light reflected by a first mirror 42a-1 while transmitting light from a display section 38. In addition, in this case, when a hole formed in an undersurface of a casing 50 of the HMD 12 is opened, a video output control section 60 may limit the output of video by the display section 38.

In addition, for example, the first mirror 42a-1 in the HMD 12 shown in FIG. 8 may be fixed at a position that opens the hole 54 and which allows the user to view a state in front of the user. Then, the video output control section 60 may control whether or not to display video on the display section 38 according to an operating signal received by an operating signal receiving section 64, for example. This enables the user to view the video when the video is displayed, and enables the user to view a state in front of the user when the video is not displayed.

In addition, for example, the second mirror 42a-2 in the HMD 12 shown in FIG. 8 may be a light control mirror capable of switching between a transparent state and a mirror state. Then, when the video output control section 60 performs control so as to display video on the display section 38, the second mirror 42a-2 may be controlled to be in the transparent state. When the video output control section 60 performs control so as not to display video on the display section 38, on the other hand, the second mirror 42a-2 may be controlled to be in the mirror state. Also in this case, the user can view the video when the video is displayed, and the user can view a state in front of the user when the video is not displayed.

Figure 9:
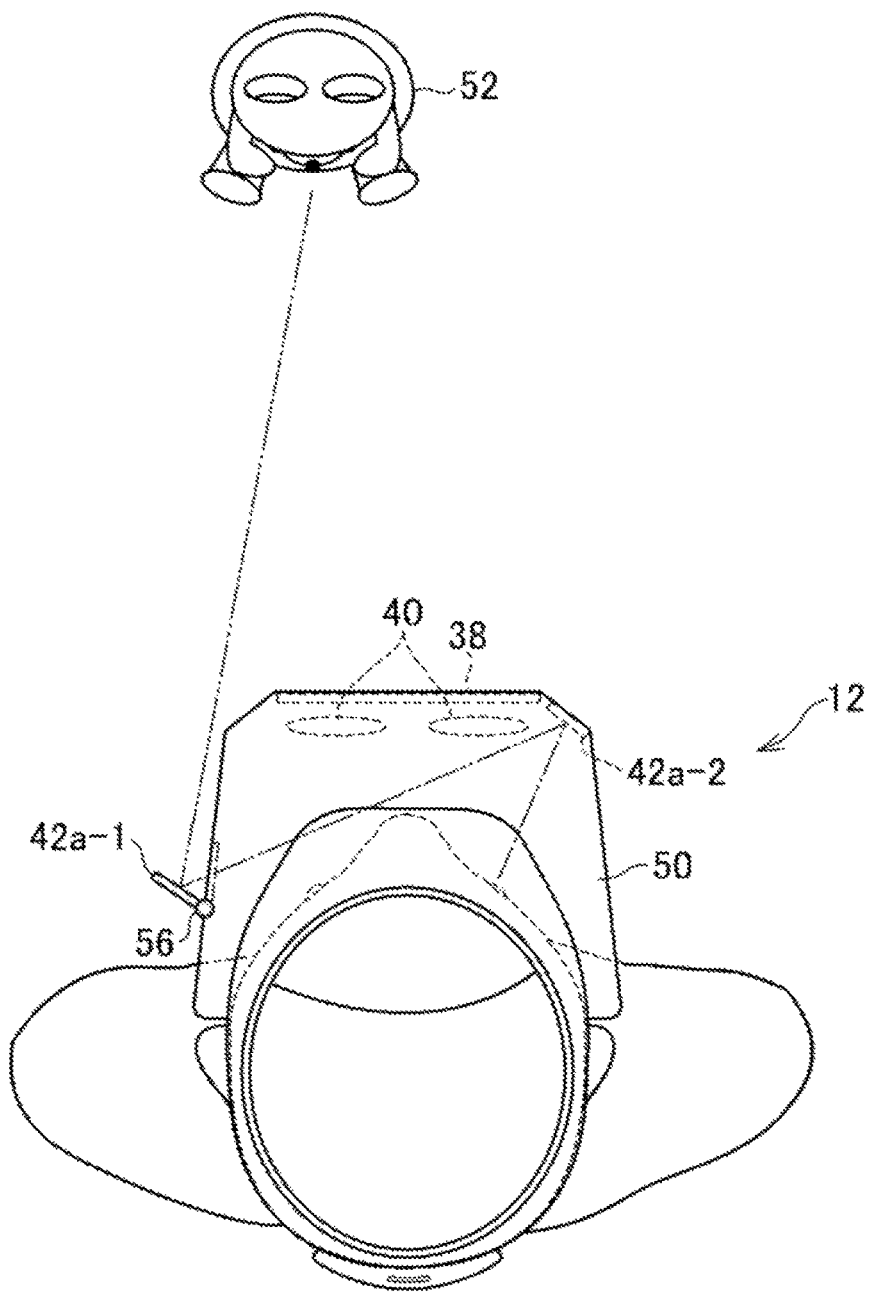
FIG. 9 is a diagram schematically showing an example of a state in which a user wearing a head-mounted display according to yet another embodiment of the present technology is viewed from above.

FIG. 9 is a diagram schematically showing an example of a state in which a user wearing an HMD 12 according to yet another embodiment of the present technology is viewed from above. As shown in FIG. 9, for example, a first mirror 42a-1 and a second mirror 42a-2 may be arranged on the left and right of a casing 50. In the example of FIG. 9, the first mirror 42a-1 is disposed on the left side of the casing 50 as viewed from above the user, and the second mirror 42a-2 is disposed on the right side of the casing 50 as viewed from above the user. Thus, the first mirror 42a-1 and the second mirror 42a-2 may not be arranged vertically in the casing 50.

In addition, for example, the first mirror 42a-1 described above may be movable vertically or horizontally. In addition, for example, the second mirror 42a-2 described above may be rotatable, or movable vertically or horizontally. In addition, for example, the user may be able to freely change the position and orientation of an external vision optical system 42 such as the first mirror 42a-1 and the second mirror 42a-2 or the like by operating a controller 20. In addition, for example, the user may be able to manually change the position and orientation of the external vision optical system 42 such as the first mirror 42a-1 and the second mirror 42a-2 or the like. In addition, for example, light external to the casing 50 may be prevented from entering the inside of the casing 50 by closing a hole 54, as described above, for example, or a part of the casing 50 may be opened at all times to allow the light external to the casing 50 to enter the inside of the casing 50 at all times.

The present technology contains subject matter related to that disclosed in Japanese Priority Patent Application JP 2015-062464 filed in the Japan Patent Office on Mar. 25, 2015, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A head-mounted display comprising:
a display section, having a front surface and a rear surface;
a casing supporting the display section,
wherein a front surface of the display section is located in front of eyes of a user along a first sight line; and
an optical system supported by the casing, the optical system allowing the user to view an image of an object disposed behind the rear surface of the display section blocked by the casing,
wherein a second sight line used to view the image of the object using the optical system is different than the first sight line used to view the display section,
wherein a hole is formed in the casing, and
wherein the optical system includes a first mirror that can open and close the hole,
wherein a reflecting surface of the first mirror faces the object when the first hole is open, and
wherein the hole forms an opening between an interior of the head-mounted display and an exterior environment.

2. The head-mounted display according to claim 1, further comprising
a video output control section controlling output of video by the display section,
wherein the video output control section limits the output of the video by the display section when the hole is opened.

3. The head-mounted display according to claim 1, further comprising
a position control section controlling a position of the first mirror such that the position of the first mirror becomes a position of closing the hole or a position of opening the hole, according to whether or not a predetermined condition holds.

4. The head-mounted display according to claim 3, wherein the predetermined condition is a condition related to a position or attitude of the head-mounted display or a condition related to magnitude of a detected sound.

5. The head-mounted display according to claim 1, wherein the first sight line and the second sight line are not parallel.

6. The head-mounted display according to claim 1, wherein the optical system further comprises a second mirror located inside the casing,
wherein a reflecting surface of the second mirror is located along the second sight line.

7. The head-mounted display according to claim 6, wherein hole is located in a top surface of the casing or a bottom surface of the casing.

8. A display control method of a head-mounted display, the head-mounted display including
a display section having a front surface and a rear surface,
a casing supporting the display section in front of eyes of a user along a first sight line, the casing having a hole formed in the casing, and
an optical system including a mirror that can open and close the hole, the optical system being supported by the casing, and the optical system allowing the user to view an image of an object disposed behind the rear surface of the display section blocked by the casing;
wherein a reflecting surface of the mirror faces the object when the hole is open,
wherein a second sight line used to view the image of the object using the optical system is different than the first sight line used to view the display section,
the display control method comprising:
limiting output of video by the display section when the hole is opened.

9. A position control method of a head-mounted display, the head-mounted display including
a display section having a front surface and a rear surface,
a casing supporting the display section in front of eyes of a user along a first sight line,
wherein the casing has a hole formed in a top surface or a bottom surface of the casing, and
an optical system including a first mirror that can open and close the hole and a second mirror located inside the casing, the optical system being supported by the casing, and the optical system allowing the user to view an image of an object disposed behind the rear surface of the display section blocked by the casing,
wherein a second sight line used to view the image of the object using the optical system is different than a first line used to view the display section
the position control method comprising:
controlling a position of the first mirror such that the position of the first mirror becomes a position of closing the hole or a position of opening the hole, according to whether or not a predetermined condition holds.

* * * * *